June 6, 1950   T. W. MOORE   2,510,130
LIQUID SEAL FOR SUBMERSIBLE MOTORS
Filed Oct. 6, 1947
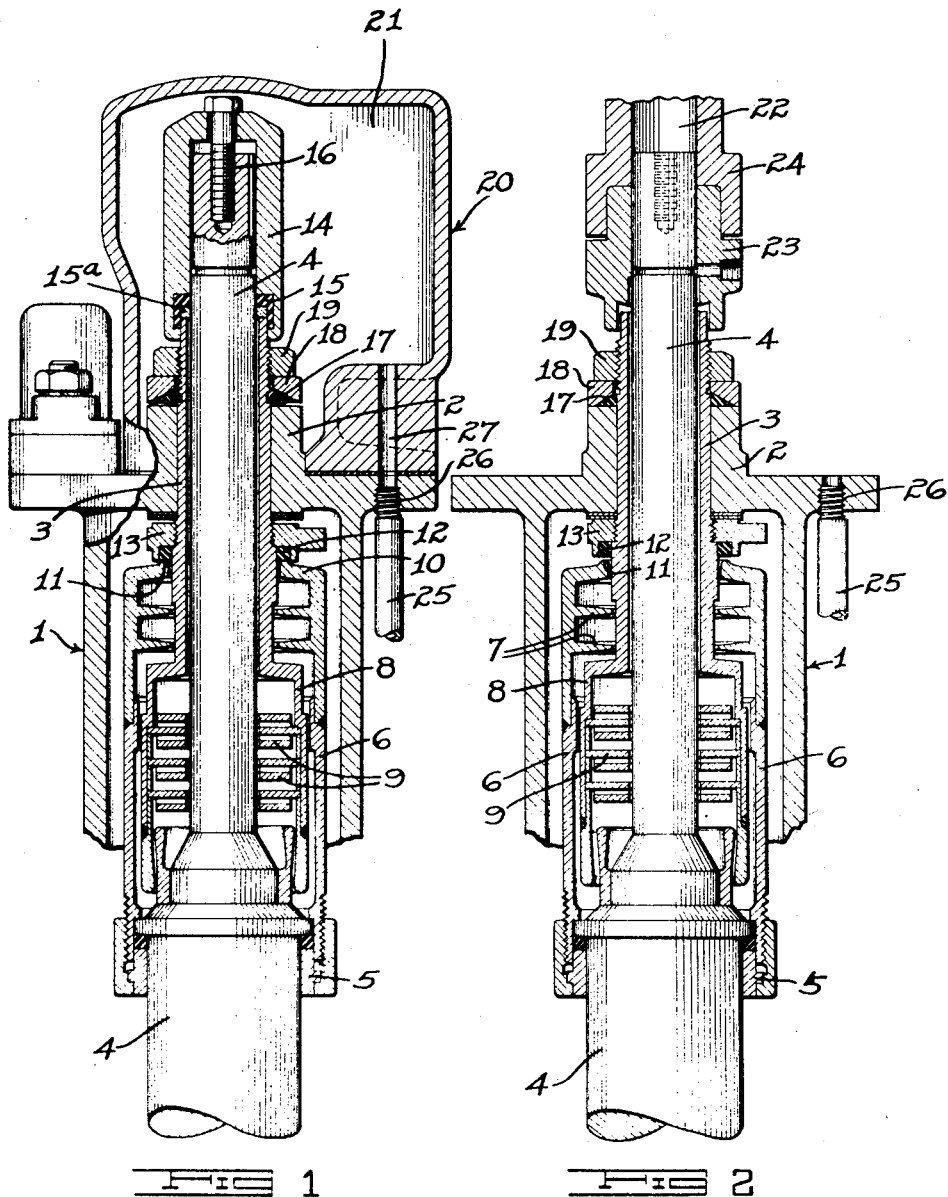
INVENTOR.
Thomas W. Moore
BY
Lyon & Lyon
ATTORNEYS Patented June 6, 1950

2,510,130

UNITED STATES PATENT OFFICE 2,510,130

LIQUID SEAL FOR SUBMERSIBLE MOTORS

Thomas W. Moore, Temple City, Calif., assignor to Byron Jackson Co., Vernon, Calif., a corporation of Delaware Application October 6, 1947, Serial No. 778,233

14 Claims. (Cl. 172—36)

My invention relates to liquid seals for submersible motors, more particularly to liquid seals wherein means is provided for entrapping the sealing liquid to facilitate shipment of the submersible motor. Heretofore, submersible electric motors which employ mercury or other liquid to seal or isolate the dielectric fluid contained in the electric motor from external liquids, for example, a motor of the type disclosed in Patent No. 2,249,763, issued July 22, 1941, to A. Hollander et al., could not be shipped with the sealing liquid in place. This is due to the fact that the ends of the sealing liquid compartment communicate with the exterior of the motor and with the motor compartment containing the dielectric fluid so that, even though the exterior end of the sealing liquid compartment were closed, the sealing liquid would drain out of its compartment into the motor compartment should the motor be laid on its side. Thus, it has been necessary to ship such motors without the sealing liquid in the sealing compartment, and to pour the sealing liquid into its compartment at the time the motor is installed for use. Introduction of the sealing liquid into the seal at the factory would have several advantages, such as insuring that the correct amount of sealing liquid is introduced and the elimination of possible errors on the part of inexperienced persons at the site of installation of the unit.

An object of my invention is to provide a means whereby the sealing liquid may be introduced at the factory where conditions are ideal and the operations fully inspected, and, thereupon, the sealing liquid itself may be sealed or isolated within its compartment so that it can neither escape nor migrate into the motor compartment, thus enabling the motor to be shipped with safety.

Another object of my invention is to provide a means of this character wherein the usual operations incidental to connecting the motor to a pump or other apparatus after the motor is mounted in place also serve to open the sealing liquid compartment so that the sealing liquid can function for its intended purpose, and, conversely, when removing the motor the sealing liquid compartment is again closed thereby reducing to a minimum the danger of loss of sealing liquid or contaminating the dielectric fluid in which the motor is immersed.

A further object of my invention is to provide a means which incorporates a cover structure adapted to enclose the protruding end of the shaft and sealed to the end of the motor housing in order to form an expansion chamber which communicates with the motor compartment so that should the dielectric liquid expand due to heat, the excess liquid may pass into the cover.

With the foregoing and other objects in view, reference is directed to the accompanying drawings in which:

Figure 1 is a fragmentary sectional view of a submersible motor having a liquid seal which incorporates my improved means, the parts being shown as they appear when the motor is prepared for shipment.

Figure 2 is a similar fragmentary sectional view showing the parts as they appear when the motor is installed for operation.

The submersible motor for which my improved liquid seal is intended includes a motor housing 1, only the upper end of which is shown in the drawings. The upper end of the motor housing is closed except for a tubular boss 2. Fitted within the boss 2 is a sleeve 3 which depends into the motor housing. Within, but spaced from the walls of the sleeve 3, is a shaft 4 which is supported by suitable bearings, not shown, within the motor housing and carries the armature of an electric motor.

Secured to the shaft 4 by a sealing gland 5 is an upwardly directed shell 6 which rotates with the shaft 4 and forms a receptacle for a sealing liquid such as mercury. The upper portion of the shell 6 is provided with internal baffles 7. The sleeve 3 extends downwardly through the internal baffles 7 and is enlarged to form a bell or apron 8 likewise provided with internal baffles 9. The lower extremity or apron portion 8 of the sleeve 3 is submerged in the sealing liquid so as to separate the surface thereof into radially outer and radially inner portions. The outer portion of the sealing liquid surface is, when the motor is in operation, in direct contact with the dielectric liquid which fills the motor housing, whereas the radially inner surface of the sealing liquid is in communication with the liquid in which the motor may be immersed, which liquid is free to enter the annular space provided between the sleeve 3 and the shaft 4.

The upper extremity of the shell 6 is provided with an internal flange 10 which terminates in close but spaced relation to the sleeve 3. The flange 10 is provided with an upwardly directed seat 11. Above the flange 10 the sleeve 3 is provided with a seal ring 12 adapted to engage the seat 11. The seal ring 12 is held by a threaded retainer ring 13. The sleeve 3 is capable of limited axial movement so that the seal formed by the seat 11 and ring 12 may be opened or closed.

The outer end of the shaft 4 is adapted to receive a cap 14, the lower end of which is recessed to receive an inverted cup-shaped, resilient packing element 15 and a metallic ring 15a interposed between the inwardly extending flange portion of the packing element and the upper extremity of the sleeve 3. The cap 14 is forced downwardly by a cap screw 16 threadedly connected to the shaft, this operation causing the flange portion of the packing element 15 to be compressed between the ring 15a and the base of the recess in the cap 14. A fluid-tight seal is thus formed between the shaft 4 and the sleeve 3, the compression of the flange portion of the packing element also causing some of the material thereof to flow outwardly and effect compression of the depending annular portion of the packing element. In this manner a fluid-tight seal is also effected between the outer surface of the upper end of the sleeve 3 and the surrounding skirt portion of the cap 14, thus preventing leakage of sealing liquid outwardly between the engaging surfaces of the ring 15a and the sleeve 3 and downwardly along the outer surface of the sleeve.

The clearance between the shaft 4 and the sleeve 3 is of such magnitude that in the absence of the metallic ring 15a which closely fits the shaft 4, the inner portion of the packing element 15 would, when compressed, be forced downwardly into the annular clearance space between the shaft and sleeve.

The protruding end of the sleeve 3 between the boss 2 and the cap 14 receives a seal ring 17, a follower ring 18 and a nut 19 so arranged that when the nut and follower ring are tightened a seal is effected between the sleeve 3 and the boss 2.

The upper end of the motor housing is adapted to receive a shipping cover 20 which encases the boss 2, sleeve 3, shaft 4, and cap 14. The lower side of the cover 20 is adapted to be bolted and sealed to the upper end of the motor housing.

Operation of my liquid seal is as follows:

When the sleeve 3 is drawn upwardly, as shown in Figure 2, by tightening the nut 19 so as to force the follower ring downwardly and compress the seal ring 17, the seal ring 12 is lifted from its seat 11 so that communication is established between the interior of the motor housing and the interior of the seal 6. When the follower ring 18 and nut 19 are released, as shown in Figure 1, and the cap 14 is placed over the shaft 4 and the cap screw 16 tightened, the sleeve 3 is forced downwardly so that the seal ring 12 engages seat 11 and isolates the interior of the shell 6 from the motor compartment. At the same time, the packing element 15 seals the space between the sleeve 3 and the shaft 4.

After the motor has been assembled, the motor compartment is filled with a dielectric liquid and the sealing compartment defined by the shell 6 is partially filled with the correct amount of sealing liquid such as mercury. The sealing liquid is introduced through the annular space between the sleeve 3 and the shaft 4. These operations are performed with the parts in the position shown in Figure 2, but with the shaft coupling shown therein removed. The nut 19 and follower ring 18 are then loosened to relieve pressure on the seal ring 17. The cap 14 is installed over the end of the shaft 4 and the cap screw 16 tightened to force the cap 14 and the sleeve 3 downwardly and simultaneously compress the packing element 15 and the seal ring 12, thus isolating the sealing liquid and preventing its escape either from the space between the sleeve 3 and shaft 4 or from the space between the sleeve 3 and shell 6. The cover 20 is then placed over the end of the motor housing and secured thereto by bolts, not shown. Under these conditions, the motor may be laid on its side, inverted or placed in any position without danger that the sealing liquid will escape from the sealing liquid compartment.

The nut 19 is purposely retracted sufficiently to avoid compression of the seal ring 17 when the sleeve 3 is forced downwardly, in order to insure that downward movement of the sleeve is resisted solely by the seal ring 12. Sealing of the joint between the sleeve 3 and the boss 2 by the seal ring 17 is unnecessary during shipment, inasmuch as any leakage of dielectric liquid from the motor compartment through this joint and into the shipping cover is unobjectionable.

A motor of the type referred to herein is especially adapted for direct connection with a pump, and is mounted for operation with the motor axis vertical. To install the unit, the motor is supported in an upright position and the shipping cover 20 is removed. The cap screw 16 is removed, permitting removal of the cap 14 and the packing element 15 and ring 15a, thus establishing open communication between the interior of the seal 6 and the exterior of the motor housing. The nut 19 is then screwed downwardly, causing the follower ring to deform the seal ring 17 into fluid-tight sealing engagement with the sleeve 3 and the boss 2. This operation also raises the sleeve 3, lifting the seal ring 12 from its seat 11, and establishing open communication between the interior of the seal 6 and the motor compartment. The seal is now in operating condition and the motor shaft may be connected to a driven shaft 22 (Fig. 2), such as a pump shaft, by coupling elements 23 and 24.

It is customary in motors of this type to provide a balance tube 25 connected at its lower extremity to the lower portion of the motor housing, the upper extremity of the tube being in open communication, under operating conditions, with the liquid in which the motor housing and pump are immersed. In this manner the interior of the motor housing is subjected to the submergence pressure of the surrounding liquid, the interior of the shell 6 being also subjected to the same pressure by reason of the annular space between the shaft 4 and the sleeve 3 being in open communication with the external liquid.

In the present instance, the upper extremity of the balance tube 25 may be threadedly connected at 26 to a threaded bore through the top flange of the motor housing, and the shipping cover 20 is provided with a passage 27 which, when the motor is assembled for shipping, registers with the upper end of the balance tube and establishes communication between the balance tube and the internal space 21 in the shipping cover. This space, being air-filled when the motor is assembled for shipping, provides an expansion chamber into which the dielectric liquid in the motor compartment may expand in the event the motor is exposed to elevated temperature during shipment or storage.

Many other embodiments of the invention may be resorted to without departing from the spirit of the invention.

I claim:

1. In a submersible motor wherein a drive shaft extends from an enclosed dielectric fluid filled motor compartment, through a sealing fluid compartment to the exterior of the motor, the combination of: a first seal means between said motor compartment and said sealing fluid compartment; an operating member exclusive of said shaft extending into said motor compartment and being operable from the exterior thereof for opening and closing said first seal means; and removable second seal means between said sealing fluid compartment and said shaft.

2. In a submersible motor wherein a drive shaft extends from an enclosed dielectric fluid filled motor compartment, through a sealing fluid compartment to the exterior of the motor, the combination of: an internal seal means between said sealing fluid compartment and said motor compartment; an operating member extending into said motor compartment parallel to said shaft for opening and closing said internal seal means, said member being axially movable from the exterior of said motor compartment; and a removable external seal means between said shaft and said sealing fluid compartment.

3. In a submersible fluid sealed motor wherein a drive shaft extends from a motor compartment through a sealing compartment to the exterior of the motor, and wherein said sealing compartment contains a sealing fluid to isolate said motor compartment from external fluids which may enter along said shaft, the combination of: internal and external seal means located at the internal and external extremities of said seal compartment adapted, when closed, to entrap the sealing fluid therein, and when opened to expose said sealing fluid to the third of said motor compartment and to external fluids in which the motor is submerged; and an operating member exclusive of said shaft extending into said motor compartment and being operable from the exterior thereof for opening and closing said internal seal means.

4. A submersible motor comprising: a housing structure, including a liquid filled motor compartment; a shaft extending from said housing; means defining a sealing compartment surrounding said shaft and including a sleeve extending with said shaft from said housing, said sealing compartment adapted to receive a sealing liquid; an internal seal means between said sealing compartment and said motor compartment movable between an open and a closed position; a removable external seal between said sealing compartment and said shaft; a removable cover adapted to be secured over the end of said housing and shaft and defining an expansion chamber; and conduit means providing communication between said motor compartment and said expansion chamber.

5. A means for enabling the shipment of a motor structure having a dielectric liquid-filled motor compartment from which extends a drive shaft and a sealing liquid-filled sealing chamber surrounding said drive shaft and wherein under operating conditions interfaces are established between the sealing liquid and the dielectric liquid and between said sealing liquid and an external fluid in which the motor structure may be immersed, said means comprising: sealing devices at the extremities of said sealing compartment to isolate and retain the sealing liquid therein; means operable from the exterior of said motor for closing said sealing devices for shipment of said motor structure and for opening said sealing devices in the course of placing said motor structure in operation; a shipping cover embracing the extended end of said shaft and sealed to said motor structure to form an expansion chamber; and conduit means providing communication between said motor compartment and said expansion chamber into which excess dielectric liquid may expand.

6. A motor structure, comprising: a motor compartment adapted to be filled with a dielectric liquid; a shaft protruding therefrom; a sleeve surrounding said shaft and also protruding from said motor compartment; a shell within said motor compartment mounted on said shaft and surrounding said sleeve, said shaft and sleeve and said sleeve and shell defining annular spaces in communication at their lower ends and forming a sealing liquid compartment; internal seal means between said sleeve and shell adapted to be opened and closed by axial movement of said sleeve, and outer seal means between said sleeve and shaft.

7. A motor structure, comprising: a motor compartment adapted to be filled with a dielectric liquid; a shaft protruding therefrom; a sleeve surrounding said shaft and also protruding from said motor compartment; a shell within said motor compartment mounted on said shaft and surrounding said sleeve, said shaft and sleeve and said sleeve and shell defining annular spaces in communication at their lower ends and forming a sealing liquid compartment; internal seal means between said sleeve and shell adapted to be opened and closed by axial movement of said sleeve, and outer seal means between said sleeve and shaft; a cover enclosing the protruding ends of said shaft and sleeve and sealingly secured to the exterior of said motor compartment to form an expansion chamber; and conduit means providing communication between said expansion chamber and said motor compartment whereby excess dielectric liquid in said motor compartment may expand into said expansion chamber.

8. A liquid seal structure comprising in combination: an annular rotatable receptacle containing a sealing liquid; an annular baffle depending downwardly into the sealing liquid and dividing the surface into radially inner and outer portions; a rotatable shaft extending through said baffle; a first seal means between said rotatable receptacle and baffle; a second seal means between said shaft and baffle, both of said seal means adapted to be closed during shipment of said seal structure to retain said sealing liquid therein.

9. A motor structure, comprising: a housing defining a dielectric liquid-filled motor chamber; a shaft protruding from said chamber through a wall of said housing; an annular rotatable receptacle secured to said shaft and containing a sealing liquid; an annular sleeve surrounding said shaft and having an inner baffle end depending into the sealing liquid and dividing the surface thereof into radially inner and outer portions, and an outer end protruding from said housing; an inner seal means between said sleeve and receptacle above said sealing liquid, adapted to be opened and closed by axial movement of said sleeve; and an outer seal means between said sleeve and said shaft.

10. A motor structure, comprising: a housing defining a dielectric liquid-filled motor chamber; a shaft protruding from said chamber through a wall of said housing; an annular rotatable receptacle secured to said shaft and containing a sealing liquid; an annular sleeve surrounding said shaft and having an inner baffle end depending into the sealing liquid and dividing the surface thereof into radially inner and outer portions, and an outer end protruding from said housing; an inner seal means between said sleeve and receptacle above said sealing liquid, adapted to be opened and closed by axial movement of said sleeve; an outer seal means between said sleeve and said shaft; a cover enclosing the protruding ends of said sleeve and shaft and sealed to said housing structure to form an expansion chamber; and conduit means providing communication between said motor compartment and said expansion chamber to permit expansion of excess dielectric liquid.

11. A motor structure comprising: a motor compartment adapted to be filled with a dielectric liquid; a shaft protruding therefrom; a shell mounted on said shaft within said compartment and defining with said shaft an annular sealing liquid compartment; an axially movable sleeve surrounding said shaft, said sleeve having a portion extending into said sealing liquid compartment and a portion protruding from said motor compartment; and seal means within said motor compartment between said sleeve and said shell and adapted to be opened and closed by axial movement of said sleeve.

12. A motor structure comprising: a motor compartment adapted to be filled with a dielectric liquid; a shaft protruding therefrom; a shell mounted on said shaft within said compartment and defining with said shaft an annular sealing liquid compartment; an axially movable sleeve surrounding said shaft, said sleeve having a portion extending into said sealing liquid compartment and a portion protruding from said motor compartment; seal means within said motor compartment between said sleeve and said shell and adapted to be opened and closed by axial movement of said sleeve; and outer seal means between said sleeve and shaft.

13. A motor structure comprising: a motor compartment adapted to be filled with a dielectric liquid; a shaft protruding therefrom; a shell mounted on said shaft within said compartment and defining with said shaft an annular sealing liquid compartment; a movable sleeve surrounding said shaft, said sleeve having a portion extending into said sealing liquid compartment and a portion protruding from said motor compartment; and seal means within said motor compartment between said sleeve and said shell and adapted to be opened and closed by movement of said sleeve.

14. A motor structure comprising: a motor compartment adapted to be filled with a dielectric liquid; a shaft protruding therefrom; a shell mounted on said shaft within said compartment and defining with said shaft an annular sealing liquid compartment; a movable sleeve surrounding said shaft, said sleeve having a portion extending into said sealing liquid compartment and a portion protruding from said motor compartment; seal means within said motor compartment between said sleeve and said shell and adapted to be opened and closed by movement of said sleeve; and outer seal means between said sleeve and shaft.

THOMAS W. MOORE.

REFERENCES CITED

The following references are of record in the file of this patent:

UNITED STATES PATENTS

| Number | Name | Date |
|---|---|---|
| 2,407,285 | King | Sept. 10, 1946 |

FOREIGN PATENTS

| Number | Country | Date |
|---|---|---|
| 131,879 | Switzerland | of 1929 |

Certificate of Correction

Patent No. 2,510,130 June 6, 1950

THOMAS W. MOORE

It is hereby certified that error appears in the printed specification of the above numbered patent requiring correction as follows:

Column 5, line 38, for the word "third" read *fluid*;

and that the said Letters Patent should be read with this correction therein that the same may conform to the record of the case in the Patent Office.

Signed and sealed this 19th day of September, A. D. 1950.

[SEAL]

THOMAS F. MURPHY,
*Assistant Commissioner of Patents.*